United States Patent [19]

Lauritano

[11] Patent Number: 4,929,111
[45] Date of Patent: May 29, 1990

[54] TOOL MANIPULATING HARMONIC BALANCER

[76] Inventor: Giuseppe Lauritano, 534 Laurel St., Redwood City, Calif. 94063

[21] Appl. No.: 22,321

[22] Filed: Mar. 2, 1987

[51] Int. Cl.⁵ ............................................. B23P 19/04
[52] U.S. Cl. ..................................... 403/16; 403/258; 403/337; 403/370; 403/299; 29/261; 29/264; 29/266
[58] Field of Search ........................ 403/16, 19, 4, 337, 403/336, 353, 370, 371, 258, 260, 261, 299, 305, 307; 29/264, 263, 266, 256, 261

[56] References Cited

U.S. PATENT DOCUMENTS

| | | | |
|---|---|---|---|
| 1,865,420 | 6/1932 | Kick | 29/264 X |
| 2,564,335 | 8/1951 | Luke | 403/4 X |
| 2,860,407 | 11/1958 | Grunder et al. | 29/266 X |
| 2,899,222 | 8/1959 | Ross | 403/16 |
| 4,022,536 | 5/1977 | Piepho et al. | 402/371 X |
| 4,457,061 | 7/1984 | Eason | 403/299 X |
| 4,463,489 | 8/1984 | James | 29/261 X |
| 4,515,037 | 5/1985 | Block | 403/258 X |

Primary Examiner—Randolph A. Reese
Assistant Examiner—Peter M. Cuomo
Attorney, Agent, or Firm—Bielen & Peterson

[57] ABSTRACT

The tool for permitting a wrench to turn a harmonic balancer and crank shaft connected to the same. The tool employs a base which may be fixed to the harmonic balancer. The base includes an opening bored through the base to form a cavity. The cavity includes wall portions having a faceted surface and a threaded surface spaced from one another. The threaded member engages the threaded surface of the cavity and extends through the opening into engagement with the crank shaft.

3 Claims, 2 Drawing Sheets

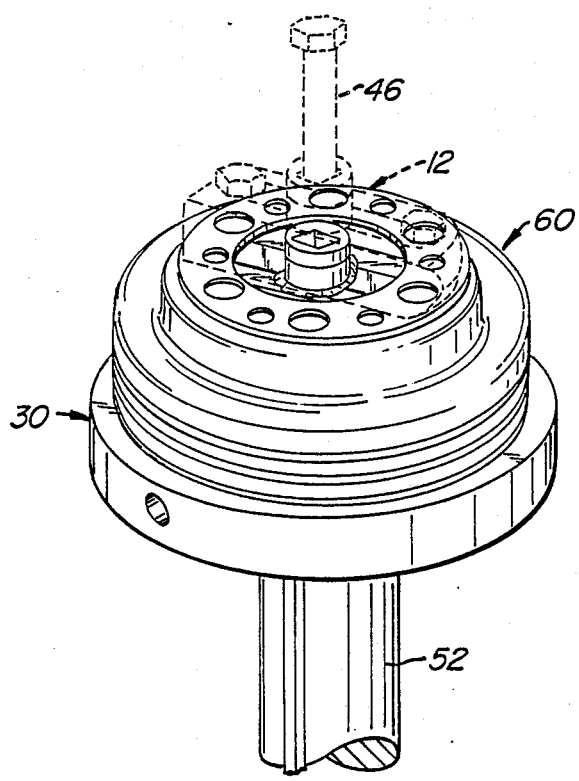
FIG.__1.
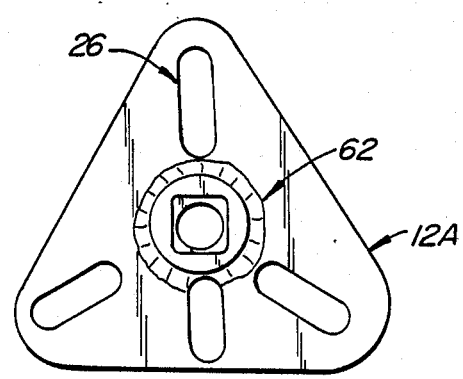
FIG.__5A.
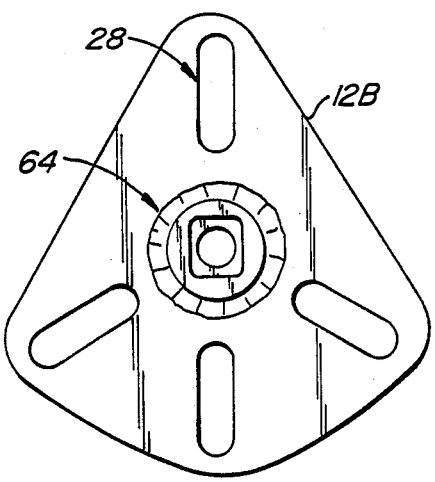
FIG.__5B.
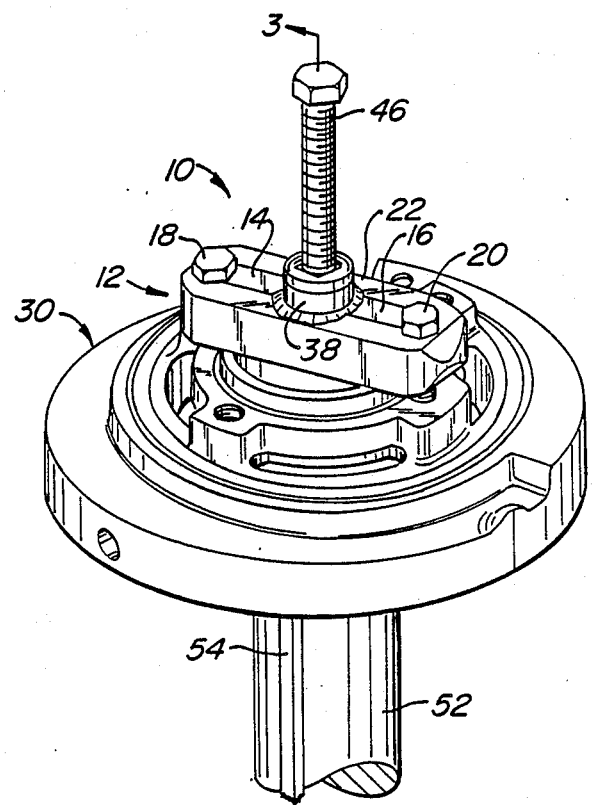
FIG.__2.
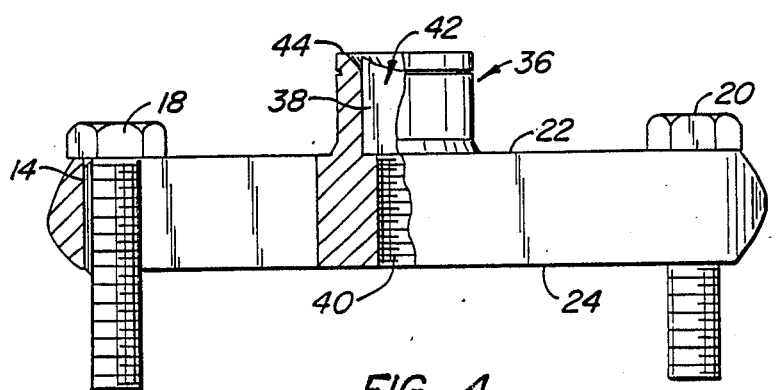
FIG.__4.

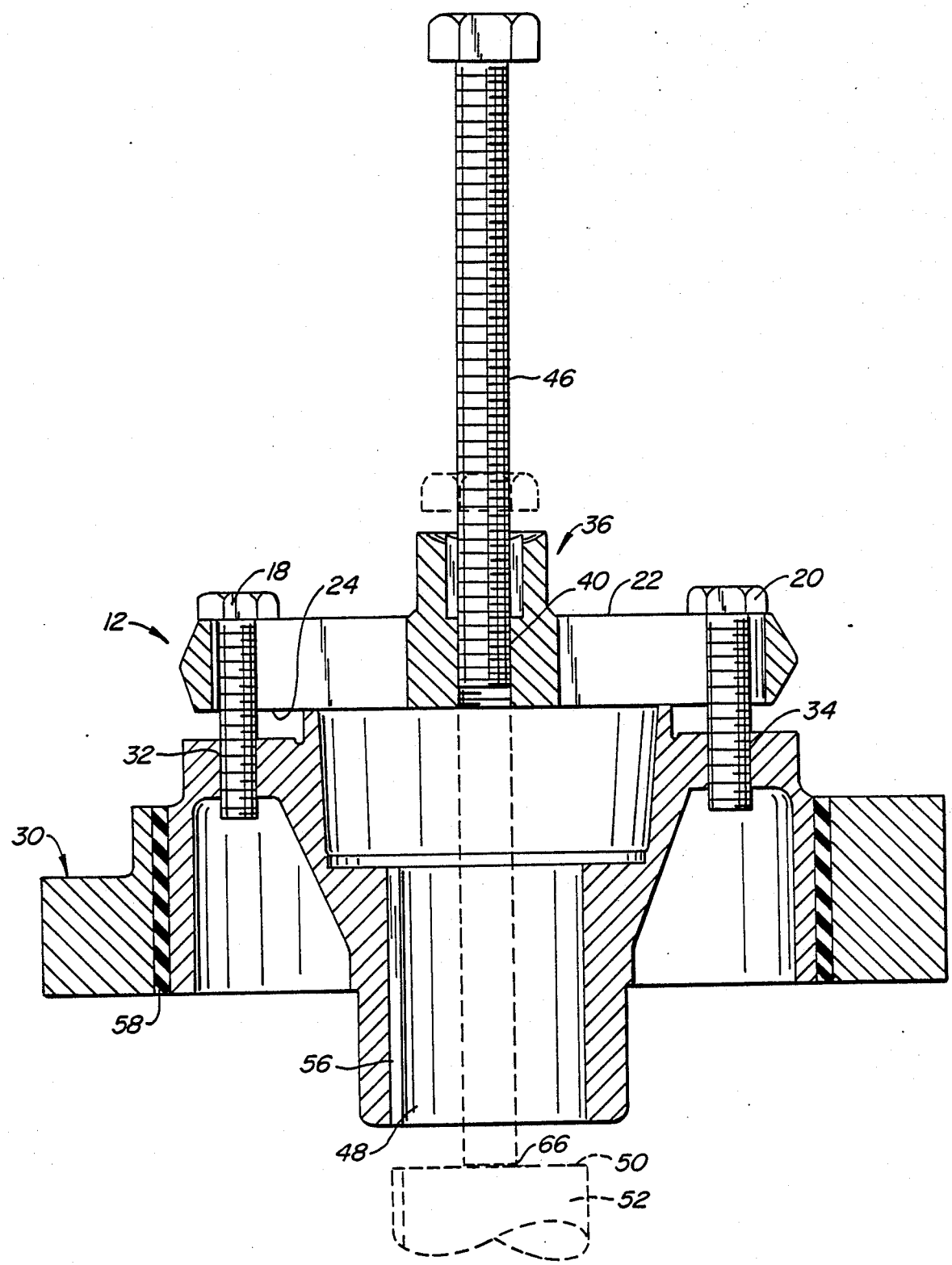
FIG._3.

4,929,111

TOOL MANIPULATING HARMONIC BALANCER

BACKGROUND OF THE INVENTION

The present invention relates to novel tool which may either turn or move an engine harmonic balancer.

The harmonic balancer on a engine is required to control vibrations of the crank shaft and to carry accessories necessary for the operation of a vehicle. To maintain or repair the inside of an engine block requires the removal of the harmonic balancer. For example, to replace a timing chain a mechanic must force the harmonic balancer from crank shaft of the engine.

Often the harmonic balancer is bolted to the crank shaft and press fitted along a keyway.

The harmonic balancer must also be turned to rotate the crank shaft for the purpose of timing the engine. Although an electrical relay may be employed to activate the starter motor, an adjustment of the crank shaft position using such a device is not accurate.

A tool which simplifies the turning or removal of the harmonic balancer of an engine would an advance in the mechanical arts.

SUMMARY OF THE INVENTION

In accordance with the present invention a novel and useful tool for manipulating a harmonic balancer of an engine is provided.

The tool of the present invention utilizes a base which is capable of being fixed to the harmonic balancer. The base includes an opening through the same which forms a cavity having an enclosing wall portion. The cavity wall portion includes a threaded surface and a faceted surface. The faceted surface would be capable of engaging a wrench. The base may also be provide with slots of closed configuration for permitting the base to be permanently fixed to the harmonic balancer. In such a situation, the base would be weight balanced relative to the crank shaft of the engine.

The tool of the present invention may also include a threaded member which is capable of threadingly engaging and moving along the threaded surface of the cavity of the base. The threaded member is also capable extending through the opening of the base into engagement with the crank shaft to cause separation of the crank shaft and the harmonic balancer.

It may be apparent that a novel and useful tool for manipulating a harmonic balancer has been described.

It is therefore an object of the present invention to provide a tool for manipulating a harmonic balancer which is universal in nature and may be permanently affixed to the harmonic balancer.

Another object of the present invention is to provide a tool for manipulating a harmonic balancer which is capable of turning the harmonic balancer and attached crank shaft as well as separating the harmonic balancer from the attached crank shaft.

A further object of the present invention is to provide a tool for manipulating a harmonic balancer which facilitates the setting of the timing of an engine.

A further object of the present invention is to provided tool for manipulating a harmonic balancer which is compatible with accessories connected to the harmonic balancer in a vehicle engine.

The invention possesses other objects and advantages especially as concerns particular characteristics in features thereof which will become apparent as the specification continues.

BRIEF DESCRIPTION OF THE DRAWINGS

FIG. 1 is a top perspective view of the tool of the present invention shown in phantom on a harmonic balancer having a pulley connected thereto.

FIG. 2 is a top perspective view of the tool of the present invention in place on a harmonic balancer.

FIG. 3 is a sectional view taken along line 3—3 of FIG. 2.

FIG. 4 is a side elevational view of the tool of the present invention depicted in FIG. 2 having a portion broken away in section.

FIG. 5a is a top plan view of the base portion of another embodiment of the tool of the present invention.

FIG. 5b is a top plan view of the base portion of yet another embodiment of the tool of the present invention.

For a better understanding of the invention reference is made to the following detailed description of the preferred embodiments thereof which should be referenced to the hereinabove described drawings.

DESCRIPTION OF THE PREFERRED EMBODIMENTS

Various aspects of the present invention will evolve from the following detailed description of the preferred embodiments which should be taken in conjunction with the above described drawings.

The invention as a whole is depicted in the drawings by reference character 10. The tool 10 includes as one of its elements a base 12 which may be constructed of a rigid material such as metal. Base 12 includes closed slots 14 and 16 which accept bolts 18 and 20, respectively. Base 12 possesses an upper surface 22 and a lower surface 24, best shown in FIGS. 2 and 4.

As depicted in FIGS. 5a and 5b, bases 12a and 12b may be used in substitution for base 12 of FIGS. 2 and 4. Base 12a possesses a plurality of slots 26. Likewise, base 12b includes a plurality of slots 28. Plurality of slots 26 and 28 are necessitated by the position of threaded openings in a particular harmonic balancer such as harmonic balancer 30 of FIG. 2.

Base 12, FIG. 2, affixes to harmonic balancer 30 by the use of bolts 18 and 20 which thread into threaded bores 32 and 34, FIG. 3. It should be noted that base 12 and base 12a are weight balanced to be permanently affixed to particular harmonic balancers. In other words, bolts 18 and 20 of base 12 would not be removed once base 12 is affixed to harmonic balancer 30. Base 12 includes a boss 36 which includes a faceted inner wall portion 38. Boss 36 may be welded or otherwise fastened to the upper surface 22 of base 12. Base 12 also possesses a threaded bore 40 which is contiguous with faceted inner wall portion 38. Bore 40 and faceted inner wall portion 38 constitute a cavity 42 which extends from lower surface 24 to upper surface 22, in particular, top surface 44 of boss 36.

A threaded member 46 is capable of threadingly engaging threaded bore 40 of base 12 and extending to cavity 48 of harmonic balancer 30. Threaded member 46 bears, or contacts, the end 50 of crank shaft 52, FIG. 3. With reference to FIG. 2 it may be seen that crank shaft 52 includes a keyway 54 which engages a slot 56 found along cavity 48 of harmonic balancer 30. Crank shaft 52 may be connected to harmonic balancer 30 by the use of a fastening such as bolts, pins, and the like (not shown). Such fastenings would be removed prior to the engagement of threaded member 46 with crank shaft end 50. It should be noted that harmonic balancer includes a resilient ring 58 to absorb shock and vibrational forces when in use.

With reference to FIG. 1, harmonic balancer 30 is depicted with a pulley assembly 60 which may be employed to run fans, air conditioners, and auxiliary accessories normally found in a vehicle. Again, base 12 and threaded member 46 may be permanently fixed to harmonic balancer 30 with pulley assembly 60 sandwiched therebetween.

Bosses 62 and 64 associated with bases 12a and 12b have the same configuration as boss 36 of base 12. In other words, bosses 62 and 64 include a faceted surface adjacent a threaded surface, such as faceted surface 38 and threaded surface 40 of boss 36.

In operation, the user bolts base 12 to harmonic balancer 30 employing bolts 18 and 20. Bases 12a and 12b would be used where a harmonic balancer has threaded bores aligning with plurality slots 26 or 28 respectively. At this point, the user may place a wrench or ratchet into faceted inter wall portion 38 and turn harmonic balancer 30 with crank shaft 52 attached thereto. This operation would be particularly useful when setting the timing in an engine employed with crankshaft 52. If harmonic balancer 30 is to be removed from crank shaft 52 the user would insert threaded member 46 in threaded bore 40 and turn the same until the end 66 contacts the end 50 of crank shaft 52 and pushes crank shaft 52 from cavity 48. Any fastening holding crank shaft 52 to harmonic balancer 30 would be removed prior to the engagement of threaded member 46 with crank shaft 52. Engagement of end 66 of threaded member 46 with crank shaft 52 is depicted in phantom in FIG. 3.

While in the foregoing the embodiments of the present invention have been set forth in considerable detail for the purpose of making a complete disclosure of the invention it may be apparent to those of skill in the art numerous changes may be made in such details without departing from the spirit and principles of the invention.

What is claimed is:

1. A tool for permitting a wrench to turn a harmonic balancer and crank shaft connected thereto, and for separating the harmonic balancer from the connected crank shaft, comprising:
    a. a base, said base including an opening therethrough forming a cavity having an enclosing wall portion, said enclosing wall portion including a threaded surface and faceted surface, said faceted surface being capable of engaging a wrench for turning said base;
    b. a threaded member capable of threadingly engaging and moving along said threaded surface of said cavity enclosing wall portion, said threaded member being capable of extending through said opening of said base into engagement with said crank shaft while engaging and moving along said threaded surface of said cavity enclosing wall portion;
    c. means for fixing said base to the harmonic balancer such that said turning of said base turns the fixed harmonic balancer;
    d. at least one closed slot through said base; said means for fixing said base to the harmonic balancer passing through said one closed slot.

2. The tool of claim 1 in which said base includes a plurality of closed slots therethrough for permitting said base to be fixed to the harmonic balancer.

3. The tool of claim 2 in which said base is weight balanced relative to said crank shaft to permit permanent fixing of said base to the harmonic balancer.

* * * * *